United States Patent [19]

Kawahara et al.

[11] 4,414,288
[45] Nov. 8, 1983

[54] MAGNETIC RECORDING MEDIUM

[75] Inventors: Hiroshi Kawahara; Hitoshi Azegami; Eiji Horigome, all of Tokyo, Japan

[73] Assignee: TDK Electronics Co., Ltd., Tokyo, Japan

[21] Appl. No.: 362,653

[22] Filed: Mar. 29, 1982

[30] Foreign Application Priority Data

Apr. 14, 1981 [JP] Japan .................................. 56-55099

[51] Int. Cl.³ .................................................. G11B 5/70
[52] U.S. Cl. .................................. 428/694; 252/62.54; 360/134; 360/135; 360/136; 427/128; 428/425.8; 428/425.9; 428/480; 428/522; 428/900
[58] Field of Search ................ 428/694, 900, 425.8, 428/425.9, 522, 480; 252/62.54; 360/134-136; 427/128, 131, 132

[56] References Cited

U.S. PATENT DOCUMENTS 3,929,659 12/1975 Graham ............................. 428/694
4,340,644 7/1982 Ota et al. .......................... 428/900

FOREIGN PATENT DOCUMENTS 2054622A 2/1981 United Kingdom ................ 428/900

Primary Examiner—Ellis P. Robinson
Attorney, Agent, or Firm—Oblon, Fisher, Spivak, McClelland & Maier

[57] ABSTRACT

A magnetic recording medium which comprises a substrate coated with a magnetic paint which has a magnetic powder dispersed in a binder comprising a vinyl chloride - vinyl acetate copolymer containing at least 10% of polyvinyl alcohol, a urethane resin and a polyester resin.

4 Claims, 1 Drawing Figure

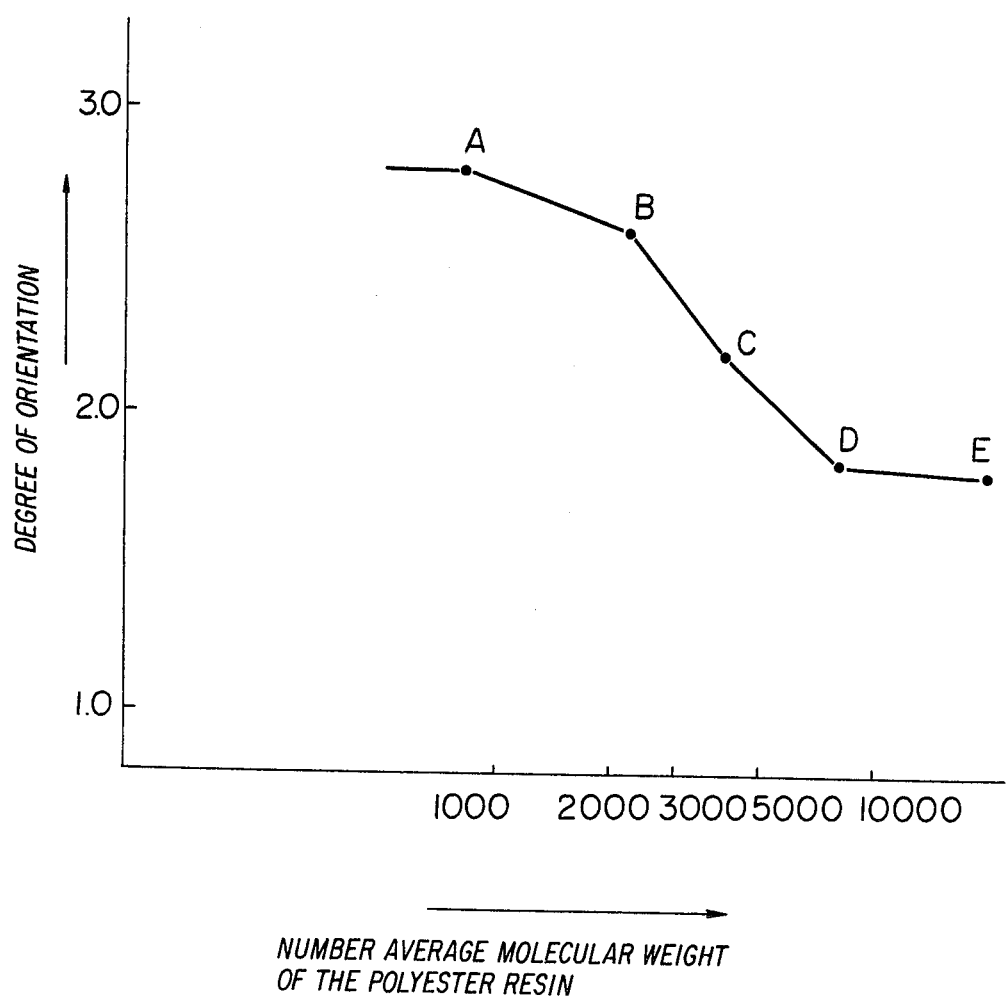

MAGNETIC RECORDING MEDIUM

BACKGROUND OF THE INVENTION

1. Field of the Invention

The present invention relates to a magnetic recording medium, especially to a magnetic recording medium which is excellent in both frequency characteristics and surface properties. More particularly, it relates to a magnetic recording medium which utilizes a vinyl chloride-vinyl acetate copolymer containing at least 10% of vinyl alcohol, a urethane resin and a polyester resin as binding components in a magnetic layer.

2. Description of the Prior Art

Generally speaking, a magnetic recording medium is produced by coating a substrate such as a film of e.g. an acetate, PVC, polyester etc. with a magnetic paint having a magnetic powder such as $\gamma$-$Fe_2O_3$ etc. dispersed in a polymer resin binder to form a magnetic layer thereon. Recently, with the expansion of uses of such magnetic recording media, further improved characteristics have been increasingly required of them. For example, in the recent magnetic recording media, especially cassette tapes for audio components, video tapes etc., those having more excellent frequency characteristics have been demanded. In order to comply with such a demand, it is generally practiced to enhance the dispersing properties of the magnetic particles in the magnetic layer and the surface properties of the magnetic layer of the magnetic recording medium. In other words, it is necessary to uniformly disperse the magnetic particles in the magnetic layer, reduce spacing loss by enhancing the surface properties of the magnetic layer, impart appropriate softness to the magnetic layer so as to improve the touch with a head, and so forth. On the other hand, in the magnetic powder itself, it is necessary to improve the coercive force, increase the saturation magnetization instensity (Is), reduce the magnetic particles in size, and so forth. However, such improved particles have a tendency that the dispersibility in the magnetic layer is lowered. Therefore, various kinds of vinyl chloride type polymers have heretofore been proposed as resin binders so as to disperse a magnetic powder, but since even such vinyl chloride type polymers have a disadvantage when used alone, combinations of a vinyl chloride-vinyl acetate copolymer with a urethane resin are being generally employed at present. However, the vinyl chloride-vinyl acetate copolymer has a disadvantage; since it has a high glass transition point and hence it is difficult to work on the surface, the surface properties are poor, whereas the urethane resin, which is soft and hence has an excellent touch with a head and also has a low glass transition point and hence is good in surface workability, suffers from a disadvantage that the dispersibility of the magnetic particles is less favorable as compared with the vinyl chloride-vinyl acetate copolymer resin. Therefore, the present situation is such that even a combination of a vinyl chloride-vinyl acetate copolymer and a urethane resin cannot present entirely satisfactory results. Under such circumstances, as a means for improvement, the present applicant once proposed a magnetic recording medium which utilizes a binder system comprising a combination of a vinyl chloride-vinyl acetate copolymer containing at least 10% of vinyl alcohol as a binder component for a magnetic layer, which was disclosed as Japanese Patent Application Laid-open No. 55-70936. As stated in that patent application, it was discovered that the addition of a small proportion of a vinyl chloride-vinyl acetate copolymer containing at least 10% of vinyl alcohol enhances the dispersibility of a magnetic powder. However, in that resin binder system, the surface properties of the magnetic coat were not completely satisfactory since the surface workability was not so good owing to the raise of the glass transition point (Tg).

In view of the above point, the present inventors have intensively studied on vinyl chloride-vinyl acetate copolymer based resin binders and, as a result, have discovered that the use of a binder obtained by adding a urethane resin to a vinyl chloride-vinyl acetate copolymer containing at least 10% of polyvinyl alcohol to plasticize it and further adding thereto a polyester resin can provide a smooth magnetic coat which has a high coercive force with a high saturation magnetization intensity and further which has finely divided magnetic particles uniformly dispersed. The present invention has been achieved based on this discovery, and it provides a magnetic recording medium, the magnetic coat of which has excellent surface properties without reducing the dispersibility of the magnetic particles in the magnetic layer.

SUMMARY OF THE INVENTION

Accordingly, the present invention provides a magnetic recording medium which comprises a substrate coated with a magnetic paint which has a magnetic powder dispersed in a binder comprising a vinyl chloride-vinyl acetate copolymer containing at least 10% of polyvinyl alcohol, a urethane resin and a polyester resin.

The present invention further provides such a magnetic recording medium in which the binder comprises, based on the total weight of the binder, 40–80% of the vinyl chloride-vinyl acetate copolymer, 10–50% of the urethane resin and 10–50% of the polyester resin, and preferably 50–70% of the vinyl chloride-vinyl acetate copolymer, 15–40% of the urethane resin and 20–40% of the polyester resin.

The present invention still further provides such a magnetic recording medium which further contains, based on the total weight of the resin binder, 10–40% by weight of a curing agent, polyisocyanate compound in the binder component in the magnetic layer.

BRIEF DESCRIPTION OF THE DRAWING

The attached FIGURE is a graph showing the relationship between the number average molecular weight of the polyester resin used in the present invention and the degree of orientation of the magnetic particles.

DETAILED DESCRIPTION OF THE PREFERRED EMBODIMENTS

It is essential for the vinyl chloride-vinyl acetate copolymer used as the binder component in the present invention to contain at least 10% of vinyl alcohol

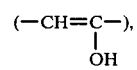

and if the content is less than this limit, the effect is reduced. Such a copolymer may be generally obtained by saponifying a vinyl chloride-vinyl acetate copolymer. Thus, by introducing hydroxyl groups by the saponification reaction, the wettability (dispersibility) of the magnetic powder may be enhanced and also functional groups may be provided for a crosslinking reaction by a polyisocyanate, thereby a magnetic coat having a three-dimentional structure is formed. As one example of the commercially available products of the vinyl chloride-vinyl acetate copolymer having a certain content of vinyl alcohol, "OH-DEX" (commercial name) produced by Electro Chemical Industry Co., Ltd. may be mentioned.

The polyurethane resin used in the present invention is either a high molecular weight urethane elastomer having no free isocyanate group or a low molecular weight urethane prepolymer having free isocyanate groups. In the present invention, commercially available products may be effectively employed, and representative examples of the commercially available products of the urethane elastomer include "Nippolan 2304", "Nippolan 3022", "Nippolan 5032", "Nippolan 5033" and "Paraplen 22S" (commercial names) produced by Nippon Polyurethane Co., "ESTAN 5702", "ESTAN 5703", "ESTAN 5711" and "ESTAN 5712" produced by Goodrich Chemical Co., U.S.A.," "CRISBON 4216", "CRISBON 4407" and "CRISBON 7029" produced by Dai-Nippon Ink & Chemicals, Inc. and the like. Examples of the urethane prepolymer include "Colonate 4080", "Colonate 4090" and "Colonate 4095" produced by Nippon Polyurethane Co., "Takenate L-1107" and "Takenate L-1006" produced by Takeda Chemical Industries, Ltd. and the like.

The polyester resin used in the present invention is preferably one having a number average molecular weight of 3,000 or less. With a number average molecular weight of greater than 3,000, the degree of orientation (dispersibility) of the magnetic particles tends to gradually decrease. The relationship between the number average molecular weight and the degree of orientation is shown in the attached FIG. 1. In this figure, A is "Desmophen 800", B is "Desmophen 2200", C and D are experimental products produced by Nippon Polyurethane Co., and E is "BYRON 200" produced by Toyo Spinning Co. This illustrates the degree of orientation (dispersibility) of the magnetic particles in the magnetic layer of each magnetic tape produced in a similar manner as in Example 1. Commercially available products may be effectively employed in the present invention, and their examples include "Desmophen 2200", "Desmophen 1700", "Desmophen 1100" and "Desmophen 800" produced by Bayer AG, "Noppolan 1004" (commercial name) produced by Nippon Polyurethane Co., "BYRON 200" produced by Toyo Spinning Co., and the like.

In the present invention, the three-component binders are employed as described above, but it is preferred to further add thereto 10-40% of a curing agent, polyisocyanate compound based on the weight of the total binder components. Examples of the commercially available products of such a polyisocyanate compound include such commercial names as "Colonate L", "Colonate HL", "Colonate 2036" etc. produced by Nippon Polyurethane Co.

The present invention is illustrated by the following examples.

EXAMPLE 1

| | |
|---|---|
| Cobalt-adsorbed γ-Fe₂O₃ | 100 parts |
| Vinyl chloride - vinyl acetate copolymer containing 11% of polyvinyl alcohol ("OH-DEX" produced by Electro Chemical Industry Co.) | 15 parts |
| Urethane resin ("Nippolan 2304" produced by Nippon Polyurethane Co.) | 5 parts |
| Polyester resin ("Desmophen 2200" produced by Bayer AG, number average m. w. of 2200) | 5 parts |
| Dispersing agent Lecithin | 2 parts |
| Methyl ethyl ketone | 80 parts |
| Methyl isobutyl ketone | 80 parts |
| Toluene | 80 parts |

The respective components in the above-described proportion were thoroughly kneaded in a ball mill for 36 hours, then 4 parts of "Colonate L" produced by Nippon Polyurethane Co. was added as a curing agent, and mixed uniformly to prepare a magnetic paint. The thus obtained magnetic paint was coated on a polyester film base of 12μ in thickness to a thickness of 4.0-7.0μ to orientate the magnetic particles, then it was dried, surface treated by super calender treatment, and heat treated at 68° C. for 48 hours to induce a crosslinking reaction, after which it was cut into 3.81 mm each in width to prepare magnetic tapes.

EXAMPLE 2

| | |
|---|---|
| Cobalt-adsorbed γ-Fe₂O₃ | 100 parts |
| Vinyl chloride - vinyl acetate copolymer containing 11% of polyvinyl alcohol ("OH-DEX" produced by Electro Chemical Industry Co.) | 15 parts |
| Urethane resin ("Nippolan 2304" produced by Nippon Polyurethane Co.) | 5 parts |
| Polyester resin ("Desmophen 800" produced by Bayer AG, number average m. w. of 800) | 5 parts |
| Dispersing agent Lecithin | 2 parts |
| Methyl ethyl ketone | 80 parts |
| Methyl isobutyl ketone | 80 parts |
| Toluene | 80 parts |

Magnetic tapes were obtained from the components in the above-described proportion in a similar manner as in Example 1.

COMPARATIVE EXAMPLE 1

Magnetic tapes were obtained in a similar manner as in Example 1, except that in the composition of Example 1, the vinyl chloride-vinyl acetate copolymer having the polyvinyl alcohol content was replaced by "VAGH" produced by Union Carbide Co., U.S.A. (commercial name, vinyl chloride-vinyl acetate copolymer).

COMPARATIVE EXAMPLE 2

Magnetic tapes were obtained similarly as in Example 1 except the the polyester was excluded from the composition of Example 1.

COMPARATIVE EXAMPLE 3

Magnetic tapes were obtained similarly as in Example 1 except that in the composition, the polyester resin was replaced by "Bairon 200" (commercial name, number average molecular weight of 20,000) produced by Toyo Spinning Co.

The results of the evaluation conducted on the magnetic tapes obtained in the above examples and comparative examples are shown in the following Table 1. In the table, the evaluation of the dispersibility is expressed in degree of orientation of the magnetic particles in the direction of the applied magnetic field, the evaluation of the surface properties is expressed in gloss value as measured using a Model GM-30 manufactured by Mirakami Shikizai Co., and for the frequency characteristics, the low field sensitivity was measured at S-333 Hz and the high field sensitivity at S-16 KHz using a Model Nakamichi 1000 II. As the reference, an alignment tape produced by TDK Co. was used.

TABLE 1

|  |  | Degree of Orientation | Gloss Value (dB) | Frequency Characteristics (dB) | |
|---|---|---|---|---|---|
|  |  |  |  | S-333 Hz | S-16 KHz |
| Example | 1 | 2.6 | +5.9 | +2.1 | +5.2 |
|  | 2 | 2.8 | +6.1 | +2.4 | +5.4 |
| Comparative Example | 1 | 1.9 | +5.1 | +0.3 | +3.1 |
|  | 2 | 2.2 | +5.0 | +1.2 | +3.0 |
|  | 3 | 1.8 | +4.2 | +0.7 | +2.7 |

As demonstrated above, where the binder systems according to the examples of the present invention were employed, since both dispersibility and surface properties were excellent, the magnetic recording media having superior frequency characteristics as compared with the conventional binder systems were successfully obtained. Further, as can be understood from the comparative examples, the dispersibility and the surface properties must be good at the same time in order to attain good frequency characteristics.

As described above, while the present invention has been illustrated using cobalt-adsorbed $\gamma$-$Fe_2O_3$ as magnetic particles, comparable effects were also obtained using $\gamma$-$Fe_2O_3$, $Fe_3O_4$, cobalt-adsorbed $Fe_3O_4$, magnetite etc. as alternative magnetic particles. Further, it is also possible to include in the binder systems of the present invention commonly employed additives such as fatty acids (e.g. myristic acid, plamitic acid, stearic acid and behenic acid), silicone oils (e.g. dimethyl siloxane), antistatic agents (e.g. metal soaps and quaternary ammonium salts), dispersing agents (e.g. fatty acid esters, phosphoric acid esters and higher alcohols) etc.

We claim:

1. A magnetic recording medium which comprises a substrate coated with a magnetic paint comprising a magnetic powder dispersed in a binder comprising a vinyl chloride-vinyl acetate copolymer containing at least 10% of polyvinyl alcohol, a urethane resin and a polyester resin, wherein the polyester resin has a number average molecular weight of 3,000 or less.

2. The magnetic recording medium according to claim 1 wherein the binder composition in the magnetic paint is 40-80% of the vinyl chloride-vinyl acetate copolymer, 10-50% of the urethane resin and 10-50% of the polyester resin based on the total weight of the binder.

3. The magnetic recording medium according to claim 1 wherein the urethane resin is a urethane elastomer or a urethane prepolymer.

4. The magnetic recording medium according to any of claims 1-3 which further contains 10-40% by weight of a polyisocyanate compound based on the total binder components.

* * * * *